(12) United States Patent
Nixon et al.

(10) Patent No.: US 7,809,679 B2
(45) Date of Patent: Oct. 5, 2010

(54) DISTRIBUTED DATA ACCESS METHODS AND APPARATUS FOR PROCESS CONTROL SYSTEMS

(75) Inventors: Mark J. Nixon, Round Rock, TX (US); Stephen Gilbert, Austin, TX (US); Mike Lucas, Leicestershire (GB); Teresa Chatkoff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 926 days.

(21) Appl. No.: 10/378,357

(22) Filed: Mar. 3, 2003

(65) Prior Publication Data

US 2004/0177060 A1 Sep. 9, 2004

(51) Int. Cl.
*G06F 17/30* (2006.01)
(52) U.S. Cl. .............. 707/609; 707/626; 707/633; 707/635; 707/610
(58) Field of Classification Search .............. 707/2, 707/3, 609, 610, 626, 633, 635, 1–10, 200–204; 709/210–225
See application file for complete search history.

(56) References Cited

U.S. PATENT DOCUMENTS

| | | |
|---|---|---|
| 5,261,094 A | 11/1993 | Everson et al. |
| 5,321,816 A | 6/1994 | Rogan et al. |
| 5,355,453 A | 10/1994 | Row et al. |
| 5,504,861 A | 4/1996 | Crockett et al. |
| 5,537,533 A | 7/1996 | Staheli et al. |
| 5,544,347 A | 8/1996 | Yanai et al. |
| 5,594,900 A | 1/1997 | Cohn et al. |
| 5,657,440 A | 8/1997 | Micka et al. |
| 5,720,029 A | 2/1998 | Kern et al. |
| 5,734,818 A | 3/1998 | Kern et al. |
| 5,742,792 A | 4/1998 | Yanai et al. |
| 5,765,172 A | 6/1998 | Fox |
| 5,768,119 A | 6/1998 | Havekost et al. |
| 5,771,354 A | 6/1998 | Crawford |
| 5,801,942 A | 9/1998 | Nixon et al. |

(Continued)

FOREIGN PATENT DOCUMENTS

GB 2 227 585 A 8/1990

(Continued)

OTHER PUBLICATIONS

"Combined Search and Examination Report." May 28, 2004, The Great Britain Patent Office.

(Continued)

*Primary Examiner*—Jean M Corrielus
(74) *Attorney, Agent, or Firm*—Hanley, Flight and Zimmerman, LLC

(57) ABSTRACT

Systems and methods of accessing a database associated with a process control system send a request for information from a client application to an intermediate data server process and determine if the information is stored within a data source associated with the intermediate data server process. The systems and methods also send a request for the information from the intermediate data server process to another process if the information is not stored within the data source and access the database to retrieve the information subsequent to the other process receiving the request for the information.

30 Claims, 6 Drawing Sheets

U.S. PATENT DOCUMENTS

| | | | |
|---|---|---|---|
| 5,828,851 | A | 10/1998 | Nixon et al. |
| 5,838,563 | A | 11/1998 | Dove et al. |
| 5,862,052 | A | 1/1999 | Nixon et al. |
| 5,890,165 | A | 3/1999 | Boudrie et al. |
| 5,909,368 | A | 6/1999 | Nixon et al. |
| 5,937,414 | A | 8/1999 | Souder et al. |
| 5,940,294 | A | 8/1999 | Dove |
| 5,946,680 | A | 8/1999 | Shorter et al. |
| 5,953,729 | A | 9/1999 | Cabrera et al. |
| 5,964,831 | A | 10/1999 | Kearns et al. |
| 5,995,916 | A | 11/1999 | Nixon et al. |
| 6,032,208 | A | 2/2000 | Nixon et al. |
| 6,052,797 | A | 4/2000 | Ofek et al. |
| 6,094,655 | A * | 7/2000 | Rogers et al. ............... 707/10 |
| 6,098,116 | A | 8/2000 | Nixon et al. |
| 6,128,657 | A * | 10/2000 | Okanoya et al. ............ 709/224 |
| 6,167,438 | A | 12/2000 | Yates et al. |
| 6,311,221 | B1 | 10/2001 | Raz et al. |
| 6,499,036 | B1 | 12/2002 | Gurevich ................. 707/103 |
| 6,539,381 | B1 * | 3/2003 | Prasad et al. ................. 707/10 |
| 6,662,198 | B2 * | 12/2003 | Satyanarayanan et al. ... 707/204 |
| 6,687,698 | B1 | 2/2004 | Nixon et al. |
| 6,704,737 | B1 | 3/2004 | Nixon et al. |
| 6,990,513 | B2 * | 1/2006 | Belfiore et al. .............. 709/203 |
| 7,043,524 | B2 * | 5/2006 | Shah et al. ................. 709/203 |
| 7,076,736 | B2 * | 7/2006 | Hugh ......................... 715/743 |
| 7,111,016 | B2 | 9/2006 | Gurevich |
| 7,127,460 | B2 | 10/2006 | Nixon et al. |
| 7,136,857 | B2 * | 11/2006 | Chen et al. ................... 707/10 |
| 7,139,811 | B2 * | 11/2006 | Lev Ran et al. ............. 709/217 |
| 7,143,419 | B2 * | 11/2006 | Fischer et al. ............... 719/328 |
| 7,257,689 | B1 | 8/2007 | Baird ......................... 711/162 |
| 2002/0007404 | A1 | 1/2002 | Vange et al. ................ 709/217 |
| 2002/0107835 | A1 | 8/2002 | Coram et al. |
| 2002/0138640 | A1 | 9/2002 | Raz et al. .................... 709/231 |
| 2003/0101223 | A1 * | 5/2003 | Pace et al. ................. 709/206 |
| 2004/0177060 | A1 * | 9/2004 | Nixon et al. .................... 707/3 |
| 2005/0014494 | A1 * | 1/2005 | Owen et al. ................. 455/419 |
| 2006/0058952 | A1 * | 3/2006 | Cooper et al. ............... 701/208 |
| 2006/0080031 | A1 * | 4/2006 | Cooper et al. ............... 701/208 |

FOREIGN PATENT DOCUMENTS

| | | |
|---|---|---|
| GB | 2227585 A | 8/1990 |
| GB | 2 295 035 A | 5/1996 |
| GB | 2 363 871 A | 1/2002 |
| JP | 02-161844 A | 6/1990 |
| JP | 11-194967 | 7/1999 |
| JP | 2000-020385 | 1/2000 |
| JP | 2000-132521 A | 5/2000 |
| JP | 2001-184250 A | 7/2001 |
| JP | 2001-526814 A | 12/2001 |
| JP | 2002-521745 A | 7/2002 |
| JP | 2002-215445 A | 8/2002 |
| WO | WO 03/041360 | 5/2003 |

OTHER PUBLICATIONS

Chinese Intellectual Property Office, Text of The Second Office Action (English Translation) in Chinese patent application No. 200410007875.0, 4 pages.

Chinese Intellectual Property Office, Text of The Third Office Action (English Translation) dated Apr. 24, 2009, in Chinese patent application No. 200410007875.0, 2 pages.

Chinese Patent Office, First Office Action for Chinese Patent Application No. 200410007875.0, issued on Aug. 31, 2007 (8 pages).

The Patent Office. *Examination Report*, May 31, 2005, 3 Pages.

The Patent Office, *Examination Report*, Nov. 1, 2005, 2 Pages.

Chinese Intellectual Property Office, Text of The Fourth Office Action (English Translation) dated Oct. 16, 2009, in Chinese patent application No. 200410007875.0, 2 pages.

Japanese Patent Office issued on Feb. 16, 2010, Notice of the Reason of Rejection (English Translation) in Japanese patent application No. 2004-057755, 9 pages.

* cited by examiner

DISTRIBUTED DATA ACCESS METHODS AND APPARATUS FOR PROCESS CONTROL SYSTEMS

FIELD OF THE DISCLOSURE

The present invention relates generally to process control systems and, more specifically, to distributed data access methods and apparatus for process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area or, in some cases, throughout the world. The process control plants, suppliers and customers may communicate with each other using a variety of communication media and technologies or platforms such as, for example, the Internet, satellite links, ground-based wireless transmissions, telephone lines, etc. Of course, the Internet has become a preferred communication platform for many business enterprises because it provides an established communications infrastructure, thereby minimizing or reducing the communication infrastructure costs for an enterprise. Additionally, the technologies used to communicate information via the Internet are well-understood, stable, secure, etc.

Each process control plant within an enterprise may include one or more process control systems as well as a number of other business-related or information technology systems that are needed to support or maintain, or that are complementary to, the overall operation of the process control systems. In general, the information technology systems associated with a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few, or possibly all, of these systems may be remotely located with respect to the plant and may communicate with the plant using the Internet or any other suitable communication link using any desired combination of wireless and/or hardwired communication media and techniques.

Each process control plant within an enterprise may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions, batch management functions, etc. In addition, each of the process control systems may include process management applications that may, for example, manage the communications of and provide information relating to alarm and/or other process events, provide information or data relating to the condition of the process or processes performed by the process control plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant.

Still further, a process control plant or enterprise may include one or more communication applications that may be used to communicate information from the process control system or plant to a user via a variety of different communication media and platforms. For example, these communication applications may include e-mail applications, paging applications, voice messaging applications, file-based applications, etc., all of which may send information via wireless or hardwired media to a desktop computer, a laptop computer, a personal data assistant, a cellular phone or pager, or any other type of device or hardware platform.

Generally speaking, enabling communications between and integrating information technology systems, user-interactive applications, process management applications and communication applications within an enterprise is extremely difficult because these systems and applications are typically distributed widely throughout the enterprise and, in some cases, are widely geographically dispersed. Further, many of the aforementioned systems and applications may be executed via handheld or portable hardware platforms such as, for example, laptop computers, cellular phones, pagers, personal data assistants, etc., many of which are configured to provide an operating environment suitable for executing complicated client applications or software including, for example, web browsers or the like that perform communication functions.

Additionally, these systems and applications typically require the development of a custom communication interface or software driver that enables the different systems and applications to communicate with each other. As a result, when any system, application, device or component within the enterprise changes due to, for example, a firmware upgrade, device replacement, etc., the custom communication driver or interface for that system, device or component may also have to be changed. Obviously, the large number of custom drivers needed results in a lot of time-consuming driver maintenance, which results in high enterprise maintenance costs. Furthermore, adding a system or application to an enterprise or a process control plant often requires an enormous programming effort because a plurality of custom communication drivers or interfaces may have to be developed to enable the new system or application to communicate with the other systems and applications within the enterprise. Thus, systems that use such custom communication interfaces are not very flexible or scalable and do not facilitate, for example, the integration of a process control system with other systems and applications, which may be provided by the manufacturer of the process control system and/or by a third party manufacturer or developer.

More recent developments directed at improving the flexibility and scalability of systems within enterprises have been accompanied by the development and proliferation of improved operating systems such as, for example, Windows XP®, Microsoft .NE™, etc. and communication protocol improvements such as, for example, Ethernet, voice over Internet protocol (IP), streaming video, etc. In addition, improved information or data transfer and central data storage devices and techniques such as those provided by, for example, extensible markup language (XML), simple object access protocol (SOAP), universal description, discovery and integration (UDDI), etc., improved orchestration systems or servers such as, for example, Biztalk®, improved programming languages that are execution platform insensitive such as, for example, Java, and a host of other improved communication and/or data management tools, standards, protocols, programming languages, etc. have been developed.

While many recent developments have increased the ease with which a plurality of systems composing a business enterprise can be configured to communicate with each other, the overall system architecture within which these systems interoperate has not meaningfully changed from well-known client-server architectures. With many known client-server architectures, clients send collected data or information to a server and receive processed results from the server that may be displayed and/or otherwise utilized by a system operator. Additionally, the server typically retains and implements or executes business or database rules to operate on or process data received from one or more clients.

Unfortunately, the use of known client-server architectures within an enterprise, process control plant, or process control system having a plurality of distributed systems that communicate via one or more communication networks is relatively inefficient because the server typically retains and executes the business logic, database rules, and/or other data intensive processing. As a result, clients must typically engage in a large number of round trip communications with the server (i.e., send requests to the server for information or data and execution of business logic and receive responsive communications from the server). A large number of round trip communications within a distributed system based on known client-server architectures can consume a significant amount of limited and, thus, valuable communication network or channel bandwidth. For example, in the case of wireless communication links (e.g., cellular and satellite links) channel bandwidth is relatively expensive and, thus, the cost per packet, bit, etc., is relatively high. In addition, communication channel latency (i.e., round trip transmission time) can result in substantial time delays, which may be unacceptable for many process-oriented functions, particularly real-time process control functions.

In any event, communication inefficiencies or difficulties due to bandwidth restrictions, costs, communication channel latency, etc. are aggravated in situations where clients are engaged in process-oriented functions and/or where servers implement process-oriented business logic because these process-oriented functions and server executed business logic require frequent requests for data and rules execution and, thus, frequent round trip communications. Likewise, clients and/or servers that are engaged in enterprise level processing activities such as, for example, enterprise optimization activities, are also typically involved in the frequent coordination and communication of large amounts of information or data. Thus, such enterprise level activities similarly aggravate the communication inefficiencies and difficulties of known client-server architectures (e.g., limited bandwidth, high data transmission costs, communication channel latency, etc.)

To reduce the demands placed on communication channels within a process control system, plant and/or enterprise (and the implementation and maintenance costs associated therewith), some systems have maintained known or traditional client-server architectures but have moved substantial amounts of data, business logic, database rules execution and data processing logic from the servers to the clients. In general, all information or data and rules that could potentially be used by the clients are moved to local storage associated with those clients. In this manner, the clients can locally access needed information, data, rules, etc. to perform their activities, thereby reducing or minimizing the amount of network communications required to do so.

Unfortunately, pushing such substantial amounts of data, rules execution, and other processing responsibilities down into client systems results in "heavy" clients that are difficult to install and administer. Further, a system based on the use of such heavy clients within a system configured in accordance with known client-server architectures results in systems that are relatively inflexible and that are not readily scalable. In particular, many systems utilizing existing client-server architectures rely heavily on ad-hoc client logic and data transport formats. In other words, each of the client applications may implement its own versions of rules and database structures. As a result, a simple database change or a change to a rule used by more than one client may require an independent and time consuming reconfiguration of a large number of client applications that could potentially use the database and/or rule. Furthermore, because the clients may be based on different types of systems, which may be associated with different manufacturers, development teams, etc., the specific manner in which a given rule has to be implemented may vary significantly from client to client, thereby making system maintenance (e.g., modification or improvement) activities very complicated and expensive. Furthermore, adding a client or server to such an existing system may require a time consuming configuration of that client to enable that client to execute one or more rules in a desired manner and to enable other clients and/or servers within the system to interoperate with the added client or server. Unfortunately, the ad-hoc code developed for already existing client applications often cannot be adapted for use (i.e., reused) with new client applications. As a result, adding a client application to such a system typically results in the development of additional new ad-hoc software or code.

SUMMARY

In accordance with one aspect, systems and methods of accessing a database associated with a process control system send a request for information from a client application to an intermediate data server process and determine if the information is stored within a data source associated with the intermediate data server process. The disclosed systems and methods may also send a request for the information from the intermediate data server process to another process if the information is not stored within the data source and may access the database to retrieve the information subsequent to the other process receiving the request for the information.

In accordance with another aspect, a process control system includes a plurality of communicatively coupled intermediate data servers, a plurality of client applications that may be in communication with one or more of the intermediate data servers and a database containing information, including at least data and rules associated with the process control system. The intermediate data servers are adapted to interoperate to retrieve and store in respective local data sources a subset of the information in accordance with the informational needs of at least some of the client applications.

DETAILED DESCRIPTION

Figure 1:
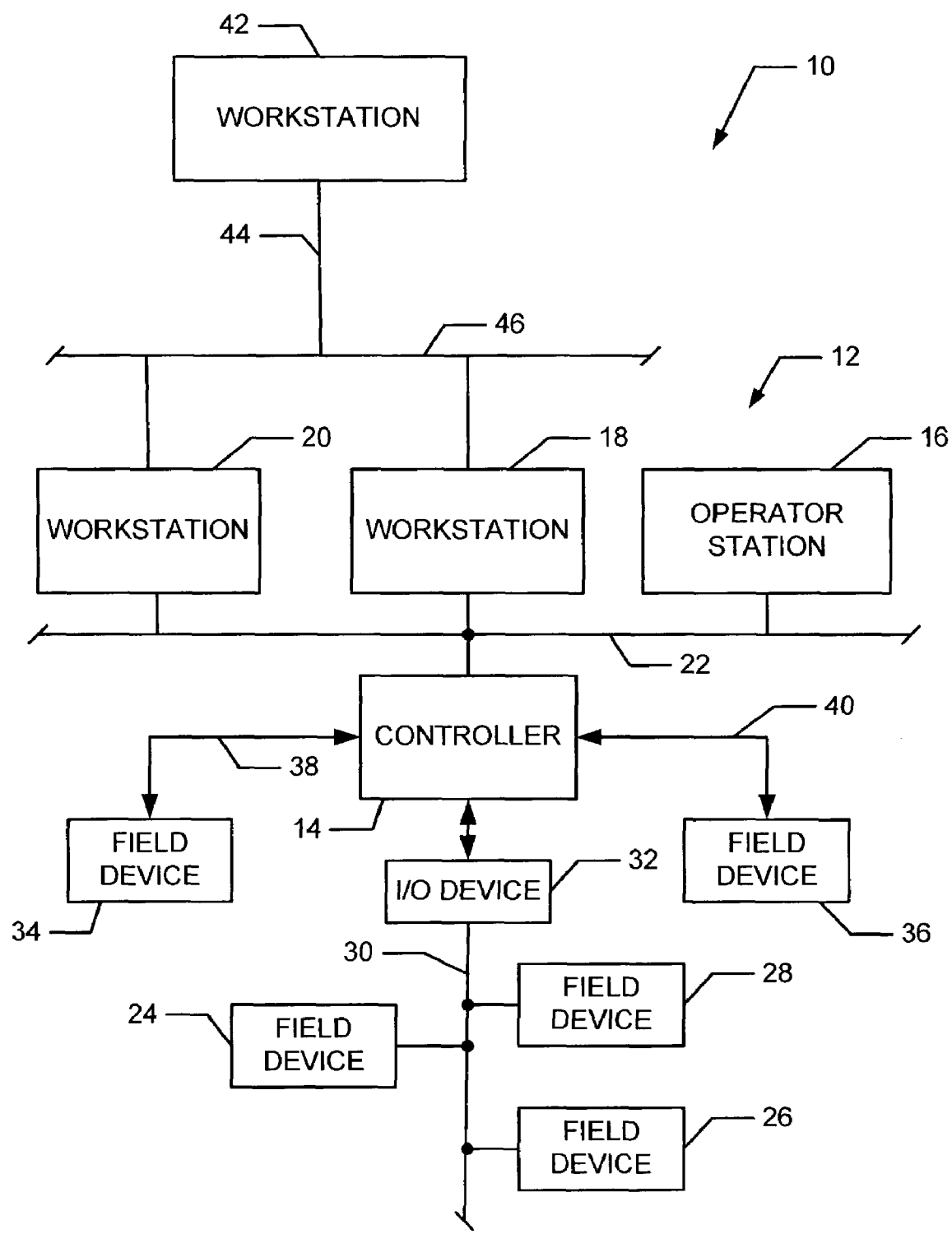
FIG. 1 is a block diagram of a portion of an example enterprise within which the apparatus and methods described herein may be implemented.

FIG. 1 is a block diagram of an example enterprise 10 that may use the distributed data apparatus and methods described herein. As shown in FIG. 1, the enterprise 10 includes a process control system 12 having a controller 14, an operator station 16, and workstations 18 and 20, all of which may be communicatively coupled via a bus or local area network (LAN) 22, which is commonly referred to as an application control network (ACN). The workstations 18 and 20 may be configured as application stations that perform one or more information technology applications, user-interactive applications and/or communication applications. For example, the application station 18 may be configured to perform primarily process control-related applications, whereas the application station 20 may be configured to perform primarily communication applications that enable the process control system 12 to communicate with other devices or systems using any desired communication media (e.g., wireless, hardwired, etc.) and protocols (e.g., HTTP, SOAP, etc.) Of course, the operator station 16 and the workstations 18 and 20 may be implemented using one or more workstations or any other suitable computer systems or processing systems. For example, the operator station and/or workstations 18 and 20 could be implemented using single processor personal computers, single or multi-processor workstations, etc.

The LAN 22 may be implemented using any desired communication medium and protocol. For example, the LAN 22 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the operator station 16 and workstations 18 and 20 may be used to provide redundant communication paths between these systems.

The controller 14 may be coupled to a plurality of smart field devices 24, 26 and 28 via a digital data bus 30 and an input/output (I/O) device 32. The smart field devices 24-28 may be Fieldbus compliant valves, actuators, sensors, etc., in which case the smart field devices 24-28 communicate via the digital data bus 30 using the well-known Fieldbus protocol. Of course, other types of smart field devices and communication protocols could be used instead. For example, the smart field devices 24-28 could instead be Profibus or HART compliant devices that communicate via the data bus 30 using the well-known Profibus and HART communication protocols. Additional I/O devices (similar or identical to the I/O device 32) may be coupled to the controller 14 to enable additional groups of smart field devices, which may be Fieldbus devices, HART devices, etc., to communicate with the controller 14.

In addition to the smart field devices 24-28, one or more non-smart field devices 34 and 36 may be communicatively coupled to the controller 14. The non-smart field devices 34 and 36 may be, for example, conventional 4-20 milliamp (mA) or 0-10 volts direct current (VDC) devices that communicate with the controller 14 via respective hardwired links 38 and 40.

The controller 14 may be, for example, a DeltaV™ controller sold by Fisher-Rosemount Systems, Inc. However, any other controller could be used instead. Further, while only one controller in shown in FIG. 1, additional controllers of any desired type or combination of types could be coupled to the LAN 22. In any case, the controller 14 may perform one or more process control routines associated with the process control system 12 that have been generated by a system engineer or other system operator using the operator station 16 and which have been downloaded to and instantiated in the controller 14.

As depicted in FIG. 1, the enterprise 10 may also include a workstation 42 that is communicatively coupled to the process control system 12 via a communication link 44, LAN 46 and the workstations 18 and 20. The workstation 42 may be configured to perform enterprise-level functions, may be associated with another process control system (not shown) and configured to perform primarily process control functions, may be configured to perform one or more communication functions, etc. In addition, the workstation 42 may be geographically remotely located, in which case the communication link 44 is, for example, a wireless communication link, an Internet-based or other switched packet-based communication network, telephone lines (e.g., digital subscriber lines), or any combination thereof.

The example enterprise 10 is provided to illustrate one type of system within which the data distribution apparatus and methods described in greater detail below may be advantageously employed. However, the data distribution apparatus and methods described herein may, if desired, be advantageously employed in other systems of greater or less complexity than the example enterprise 10 shown in FIG. 1 and/or systems that are used in connection with process control activities, enterprise management activities, communication activities, etc.

The data distribution apparatus and methods described herein use a hierarchical object-oriented database schema in conjunction with a plurality of inter-linked or communicatively coupled intermediate data servers to maximize the efficiency with which client applications can access data and/or rules stored within a common database. More specifically, the intermediate data servers may use information relating to the expected or predetermined information or data demands of client applications to selectively retrieve information or data from a database and locally store such selectively retrieved information or data to enable the client applications to more quickly and efficiently access the data or information.

In addition to their locally stored data, the intermediate data servers may also locally store and execute business or database rules as needed. In this manner, the intermediate data servers, once loaded with the information or data needed by local client applications, can substantially reduce the amount of round trip communications (and time) required to carry out the activities of the client applications. In other words, the intermediate data servers locally store (e.g., cache) a sufficient quantity of information and associated rules. Such information and rules are typically a subset of the information and rules retrieved from an enterprise database, thereby enabling local client applications to quickly access needed information and rules and perform a plurality of sequential operations prior to committing changes back to the database. As a result, the client applications can minimize the amount of data latency (due to communication channel latency) introduced into the execution of client applications that require access to information, data and/or rules that originate from a central or common database (e.g., a plant level or enterprise level database). The processing speed efficiencies gained through such a distribution of data and associated rules are substantial, particularly in cases where the central data repository or database is accessed by a large number of systems distributed throughout an enterprise and where the communication links between the client applications and the database are highly stressed (i.e., are near or above their inherent capacity to supply the information demanded by the systems coupled to the links).

Figure 2:
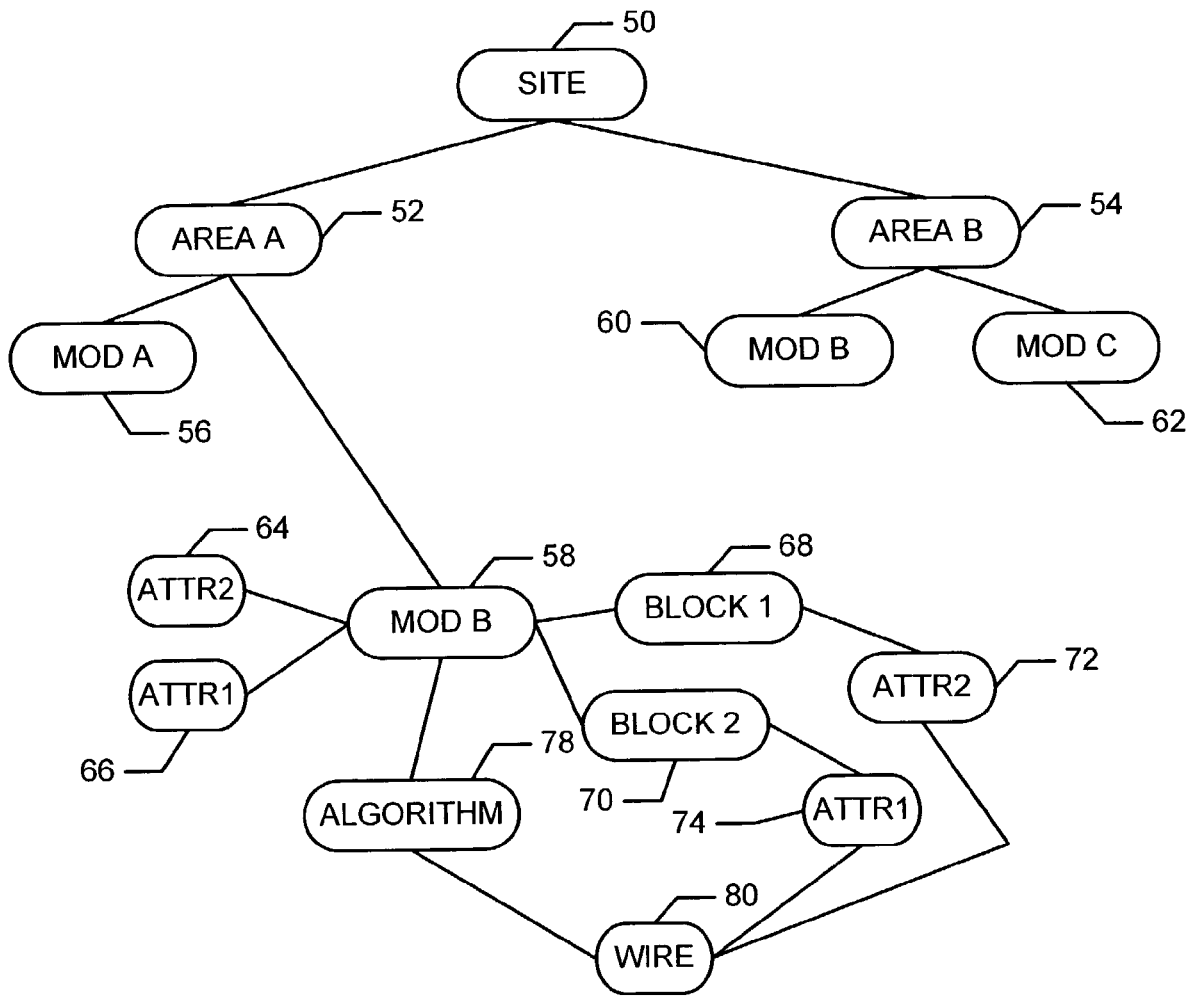
FIG. 2 is a diagrammatic view of an example database schema that is based on a well-known object hierarchy and that may be used to implement the disclosed apparatus and methods.

FIG. 2 is a diagrammatic view of an example database schema that is based on a well-known object hierarchy and that may be used to implement the data distribution apparatus and methods described herein. In general, the example database schema shown in FIG. 2 is structured as a web of hierarchically-related objects. In other words the database schema shown in FIG. 2 is structured to represent information in an elemental manner so that virtually every piece of information is represented as a separate object within the hierarchy. The particular example shown in FIG. 2 is typical of a schema that may be used to represent the control system aspects of a process control system or an enterprise such as the enterprise 10 and the control system 12 depicted in FIG. 1. Of course, the database schema of FIG. 2 is only one example and many other schemas could be used instead. For example, schema implementations may vary depending on whether a particular schema is to be used during runtime, for off-line editing or configuration activities, or for some other purpose.

As shown in the example hierarchy of FIG. 2, a site object 50 (SITE) representing a physical plant, which may be all or a portion of an enterprise such as the enterprise 10 shown in FIG. 1, is composed of a plurality of area objects 52 and 54 (AREA A and AREA B). The area objects 52 and 54 are associated with particular physical areas within the plant represented by the site object 50. For example, the area object 52 may be associated with a particular portion of a production process in a particular physical location of a plant and the area object 54 may be associated with another portion of that production process (or another production process) that may be located in another physical location of the plant represented by the site object 50.

The area objects 52 and 54 are composed of respective control modules 56 (MOD A), 58 (MOD B), 60 (MOD B) and 62 (MOD C). Control modules contain control routines that may be instantiated and executed to perform control functions or activities associated with their respective plant areas. More specifically, each of the control modules 56-62 may be associated with one or more pieces of physical equipment or devices and, thus, may be used to monitor and/or control that equipment or devices. Although the example hierarchy of FIG. 2 depicts each of the areas 52 and 54 as having two control modules, a single or more than two control modules could be associated with each of the areas 52 and 54.

Each of the modules 56-62 may be composed of further objects and sub-objects. However, for purposes of discussion, such objects and sub-objects are described below only in connection with the module 58 (MOD B). As shown in FIG. 2, the module 58 may be associated with one or more attributes 64 and 66 (ATTR2 and ATTR1) and one or more function blocks 68 and 70 (BLOCK 1 and BLOCK 2). The attributes 64 and 66 may be parameters such as, for example, input variables, output variables, or the like that are associated with the physical and/or control conditions within a plant or enterprise. The function blocks 68 and 70 may each contain one or more mathematical functions (e.g., summation operations, multiplication operations, division operations, etc.), logical functions or expressions (e.g., logical ORing, ANDing, etc.), or any other desired functions. Each of the function blocks 68 and 70 may also be associated with one or more attributes 72 and 74.

In addition to attributes and function blocks, the module 58 may further be associated with an algorithm 78, which may be composed of one or more software routines that perform sequences of mathematical and/or logical operations. Still further, the example hierarchy shown in FIG. 2 may include one or more wire objects 80 (WIRE), which correspond to graphical representations of wires that are used in connection with the graphical display of the overall control hierarchy represented by the example of FIG. 2.

An object hierarchy and database schema, such as that shown in the example of FIG. 2, enables a user or system operator to expose, via a graphical user interface or the like, any desired level of detail or information about the configuration of a plant and its control systems, which are represented by that object hierarchy. In other words, a user or system operator can traverse the hierarchy (i.e., move through the hierarchy) from an object to one or more associated sub-objects to expose any level of detail needed. For instance, after having exposed the information or data associated with the area object 52 (AREA A), a user may traverse the hierarchy to expose the information or data associated with the module 58 (MOD B) and then, in turn, any of the objects 64-80 associated with the module 58.

Figure 3:
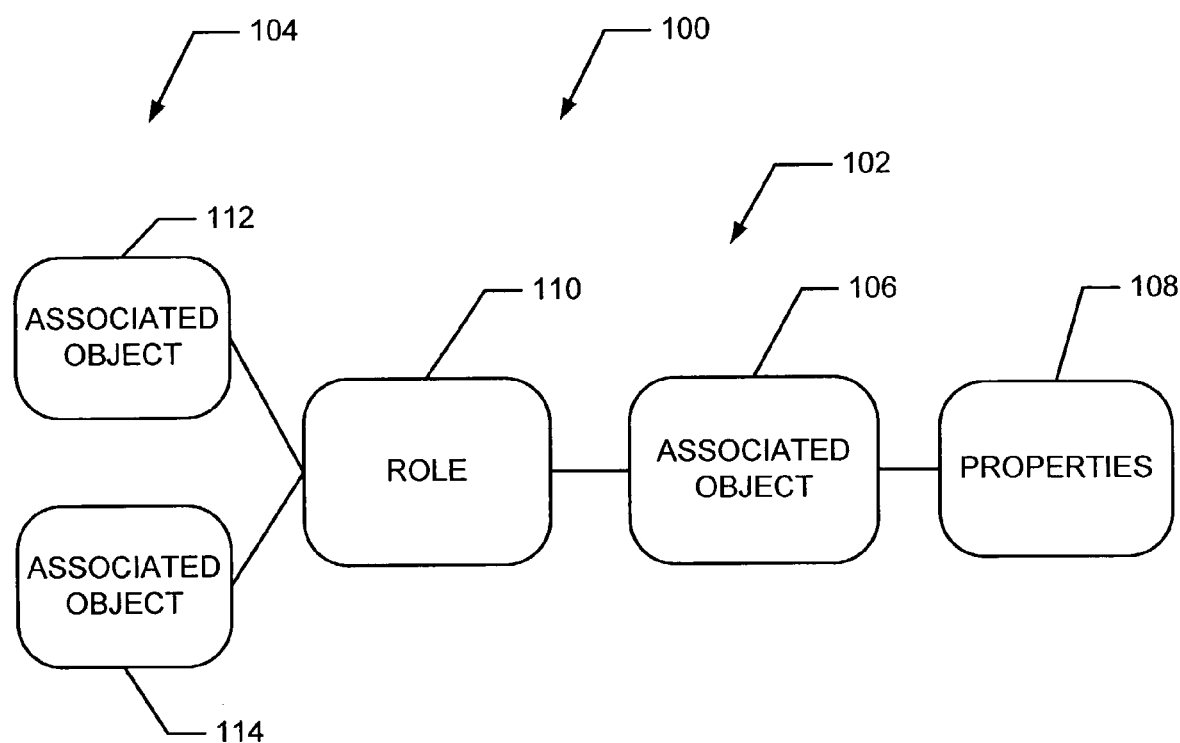
FIG. 3 is a diagrammatic view of an example object configuration that may be used with the disclosed apparatus and methods.

FIG. 3 is a more detailed diagrammatic view of an example object configuration 100 that may be used with the methods and apparatus described herein. The example object configuration 100 shown in FIG. 3 may be generalized and used as a basic structure or template to compose each of the objects and sub-objects shown in FIG. 2. As shown in FIG. 3, the object configuration 100 includes a main object portion 102 and an associated object portion 104. The main object portion 102 includes an associated object 106, properties 108 and a role 110. The associated object 106 may contain, among other information or data, the name of the object represented by the main object portion 102 as well as a unique identifier. The properties 108 may contain characteristics of the associated object 106 type such as, for example, a description and a scan rate in the case where the main object portion 102 is a module.

The role 110 characterizes the association between the associated object 106 and one or more associated objects 112 and 114 within the associated object portion 104. The role 110 characterizes the association (i.e., straddles or interfaces) between the associated object 106 and the associated objects 112 and 114 in the forward and the reverse directions. Such characterization may, for example, include information pertaining to permissible multiplicity and permissible propagation of operations between the associated object 106 and the associated objects 112 and 114. For example, a module type object may have multiple instances of a particular block object. However, any one of those usages can only be associated with a single module. In addition, if the usage of a block object is deleted (e.g., via user interface), all of the attributes and blocks within that block object (i.e., the attributes and blocks that depend from it) are also deleted. However, it may be desirable to prevent deletion of a node (e.g., an area or a site) if such node currently has assigned modules.

In a particular example, the main object portion 102 may, for example, correspond to the module 58 (i.e., MOD B) and, thus, the properties 108 may then correspond to a description and a scan rate. The role 110 may associate the module 58 (i.e., the associated object 106) with the attributes 64 and 66 (i.e., the associated objects 112 and 114) and may further specify that the attributes are to be propagated in the forward direction (i.e., from the associated objects 112 and 114) to the associated object 106 and that deletions are to be propagated from the associated object 106 to the associated objects 112 and 114 (i.e., from the module 58 to the attributes 64 and 66).

The example object hierarchy and object structure shown in FIGS. 2 and 3 and described above enables a user or system operator to create a database containing the configuration information (e.g., control configuration information, physical configuration information, etc.) of a process control system, plant or enterprise. Such a hierarchical database can be easily traversed or navigated to expose any desired type and amount of detail relating to aspects of the system represented by the database.

Past or known systems typically maintained an object structure such as that shown in FIGS. 2 and 3 in a central repository or server that maintained a database accessible by one or more client applications or other entities via a communication network. In addition, rules associated with the information in the database have typically been stored within the database and executed by the server for the client applications. Thus, client applications in known systems have relied on a central server for their data needs, rules processing needs, etc. As a result, as the complexity of an enterprise or other system increases, the amount of communications conveyed via the communication network that couples the clients and the server increases dramatically, thereby significantly reducing the execution rate and processing efficiency of the client applications.

The example distributed data access methods and apparatus described below utilize one or more intermediate data servers to distribute information and rules information for local access and execution by client applications. In other words, an object-based hierarchical database, such as that composed in a manner similar or identical to the example of FIG. 2, may be resident within a central data repository (e.g., a server) and the intermediate data servers may demand load portions of that database along with associated rules as needed by client applications that are local to the intermediate data servers. Although data and rules may be demand loaded as needed by client applications, some or all of the data and/or rules may be loaded in local storage prior to runtime. For instance, the same set or rules may be locally loaded using a common set of net assemblies (e.g., DLLs) at each of the client locations. In that case, when demanded data arrives at a particular client process during runtime, the data is automatically transformed using the locally stored rule set into an appropriate hierarchical data structure.

In any case, the example data access methods and apparatus described herein can distribute database information and associated rules to intermediate data servers that are local or proximate to client applications, as opposed to requiring all client applications to interface with a single centralized database resident within a server for their informational needs and rules processing needs. Thus, the data distribution apparatus and methods described herein may be employed to reduce or minimize the amount of network communications (e.g., round trip communications) required to enable the client applications to access needed data and to perform their functions, which results in faster execution times for the client applications and improved currency of the applications.

Figure 4:
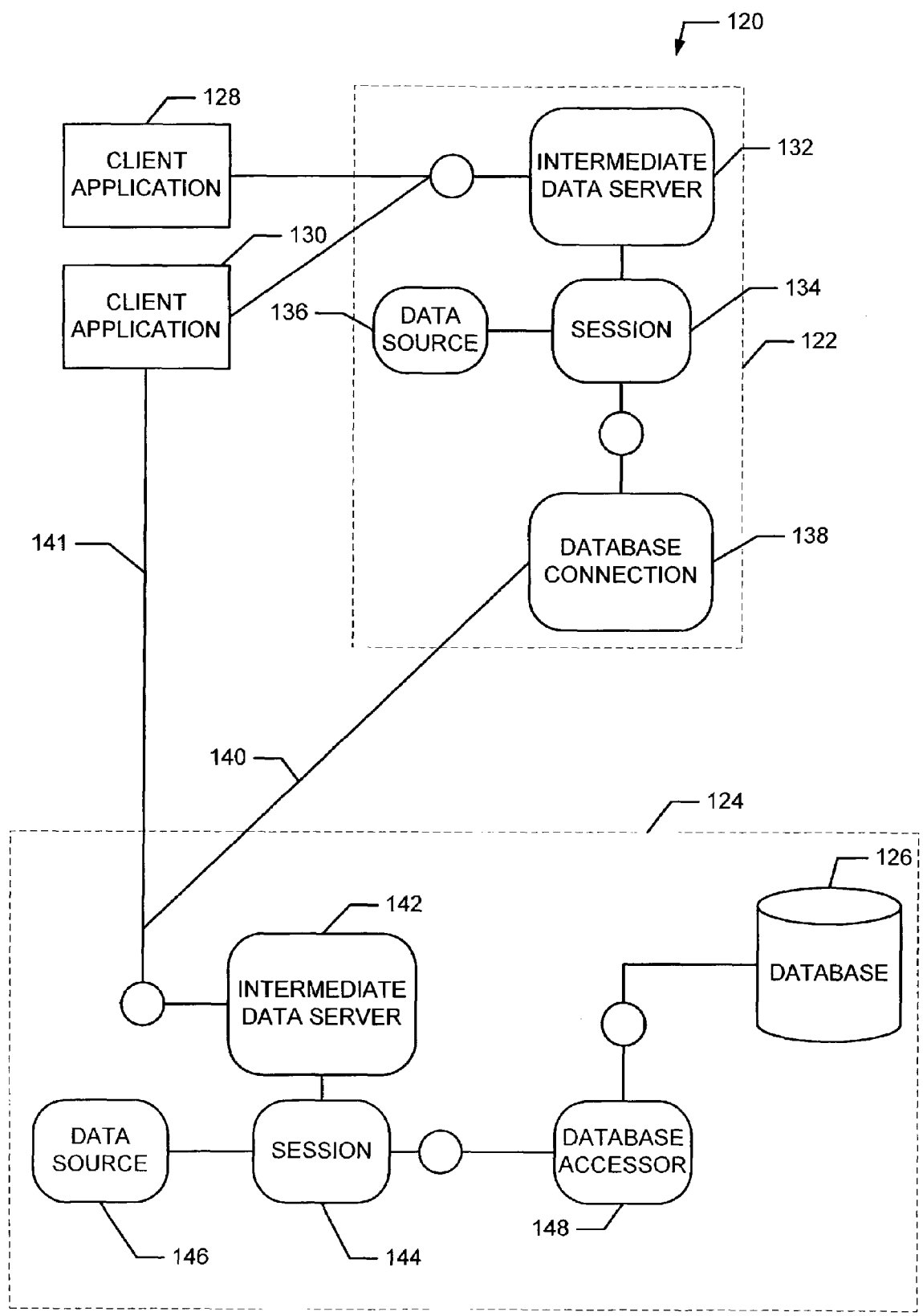
FIG. 4 is a block diagram depicting an example system including a plurality of intermediate data servers that interoperate to access a database.

FIG. 4 is a block diagram that depicts an example system 120 having a plurality of communicatively coupled data server processes 122 and 124 that interoperate to access a database 126. The data server process 122 is an intermediate data server process that may be performed within a workstation or processor system (such as, for example, one of the workstations 18, 20 and 42 of FIG. 1) and may be proximate and communicatively coupled to one or more client applications 128 and 130. The client applications 128 and 130 may be instantiated within the same workstation or processor system as the intermediate data server process 122 and/or another workstation or processor system that is communicatively coupled to the client applications 128 and 130.

The intermediate data server process 122 includes an intermediate data server 132 and a session 134 that coordinates the exchange of information or data between a local data source 136 and a database connection 138. In general, when the intermediate data server 132 receives a request for data from one or more of the client applications 128 and 130, the intermediate data server 132 traverses the data source 136 via the session 134 to determine if the requested information or data is locally available (i.e., is available within the data source 136 of the intermediate data server process 122). A more detailed description of the manner in which the session 134 traverses the data source 136 is provided in connection with FIG. 5 below.

Although not shown in FIG. 4, each of the client applications 128 and 130 may each include a session, a data source and a database connection similar or identical to the session 134, data source 136 and database connection 138 shown in connection with the intermediate data server process 122. In this manner, the client applications 128 and 130 can communicate directly with the data server process 124 directly (i.e., the client applications 128 and 130 do not have to communicate with the data server process 124 through the intermediate data server process 122).

If information requested by the client applications 128 or 130 is not locally available from the data source 136, the session 134 causes the database connection 138 to send a request for the information to the intermediate data server 124 via a communication link 140. Additionally or alternatively, in the event that the client application 130 has requested data that is resident within the database 126, the client application 130 could request such data or information directly from the data server process 124 via a communication link 141. Of course, the client application 128 could also request information directly from the data server process 124 via its own link (not shown). In any case, the communication links 140 and 141 may be implemented using any desired combination of wireless or hardwired media and may employ any desired combination of communication protocols or techniques. For example the communication links 140 and 141 may include telephone lines and/or a switched-packet communication network (e.g., the Internet). The data or information conveyed via the communication-link 140 is preferably, but not necessarily, formatted using an extensible markup language (XML) and is transmitted using a transport mechanism based on, for example, the well-known transmission control protocol (TCP) or the hypertext transport control protocol (HTTP). In addition, a message encoding protocol such as, for example, simple object access protocol (SOAP) may be used in conjunction with information sent using HTTP.

The data server process 124 includes an intermediate data server 142, a session process 144, a data source 146 and a database accessor 148 that is used to access the database 126. The intermediate data server 142 receives requests for information or data from the intermediate data server process 122 via the communication link 140 and/or from one or more of the client applications 128 and 130 via, for example, the communication link 141. As described above, such requests for information or data are coordinated by a session process and conveyed via a database connection in the event the session process traverses the data source and determines that the requested information or data is not locally available (e.g., cached within the local intermediate data server process). The intermediate data server 142 uses its session process 144 to traverse its local data source 146 to determine if the requested information (i.e., the information originally requested by one or more of the client applications 128 and 130), is locally available (e.g., cached within the intermediate data server process 124). If the session process 144 determines that the requested information or data is not available within the data source 146, the session process 144 retrieves the requested information or data from the database 126 via the database accessor 148. The database accessor 148 may be any desired database server process that enables information or data stored within a hierarchically arranged object-oriented database such as the example database structure shown in FIG. 2.

Once the requested information or data has been retrieved from the database 126, the information or data is conveyed by the intermediate data server process 124 via the communication link 140 to the intermediate data server process 122 and/or is conveyed directly to one or more of the client applications 128 and 130 via, for example, the link 141. In the event that the intermediate data server process 122 receives the retrieved information or data via the database connection 138, it conveys the retrieved information or data to the client applications 128 and 130 that originally requested the information or data via the session process 134 and the intermediate data server 132.

Thus, the intermediate data server process 122 uses its local data source 136 (e.g., a local cache) to store information or data needed by the client applications 128 and 130, as such information is needed (i.e., on demand) by the client applications 128 and 130. In the event the intermediate data server process that is proximate or local to a client application that is requesting information or data (e.g., one of the client applications 128 and 130) and the local data server process 122 does not currently have the requested information available within its local data source (e.g., the data source 136), a request for that information or data may be propagated through one or more other intermediate data server processes (e.g., the intermediate data server process 124) to a server or other process that ultimately has access to a database (e.g., the database 126) that contains the entire configuration database associated with the enterprise (e.g., the enterprise 10) or other system within which the client application is operating.

Although the example shown in FIG. 4 depicts two intermediate data server processes chained together, more than two intermediate data server processes could be chained together if desired. In that case, the database accessor 148 could instead be another database connection (i.e., similar or identical to the database connection 138) that is communicatively coupled to another intermediate data server process and ultimately a database such as the database 126. Of course, because the client applications 128 and 130 may also have their own respective sessions, data sources and database connections, these applications 128 and 130 could directly access the data server process 124 or any other similar or identical data server process as described above, if desired. However, in some cases, such direct access of the data server process 124 by the client applications 128 and 130 may be avoided if possible (i.e., if the requested data is more locally available at for example the intermediate data server process 122) to minimize the communications demands on the central database 126.

The information or data that is stored in the database 126 and which may be conveyed via the intermediate data server processes 122 and 124 for use by the client applications 128 and 130 includes all the information or data that composes an object-oriented configuration model for an enterprise. For example, all the information associated with the hierarchically arranged objects including attribute values, database rules or associations, etc. may be conveyed as needed (or, in the case of rules, prior to runtime, if desired) from the database 126 to one of the client applications 128 and 130 and locally stored (e.g., within the data source 136) and, in the case of rules and the like, locally executed. Once the information or data that is needed by the client applications 128 and 130 is locally stored in the data source 136, subsequent requests for that same information by the client applications 128 and 130 do not result in communications via the communication links 140 and 141. As a result, example system 120 shown in FIG. 4 enables the information contained within a complex hierarchical object-oriented configuration database for an enterprise or other system to be locally distributed and stored where needed and as needed, thereby reducing the overall amount of network communications required to support the informational needs of the client applications that make up the enterprise or other system.

The intermediate data server processes 122 and 124 may be instantiated within physically separate workstation or processing systems that are communicatively coupled via the communication link 140, which may be a part of a communication network. However, the intermediate data server processes 122 and 124 could, alternatively, be instantiated within the same workstation or processing system.

The functional blocks shown in the example system 120 FIG. 4 may be implemented as objects, processes, etc. using any desired combination of software, firmware and hardware. For example, one or more microprocessors, microcontrollers, application specific integrated circuits (ASICs), etc. may access instructions or data stored on machine or processor accessible storage media to implement the apparatus and methods described herein. The storage media may include any combination of devices and/or media such as, for example, solid state storage media including random access memory (RAM), read-only memory (ROM), electrically erasable programmable read-only memory (EEPROM), etc., optical storage media, magnetic storage media, etc. In addition, any software or firmware used to implement the functional blocks shown in FIG. 4 may additionally or alternatively be delivered to and accessed by the processor or other device or devices executing the software via the Internet, telephone lines, satellite communications, etc.

Figure 5:
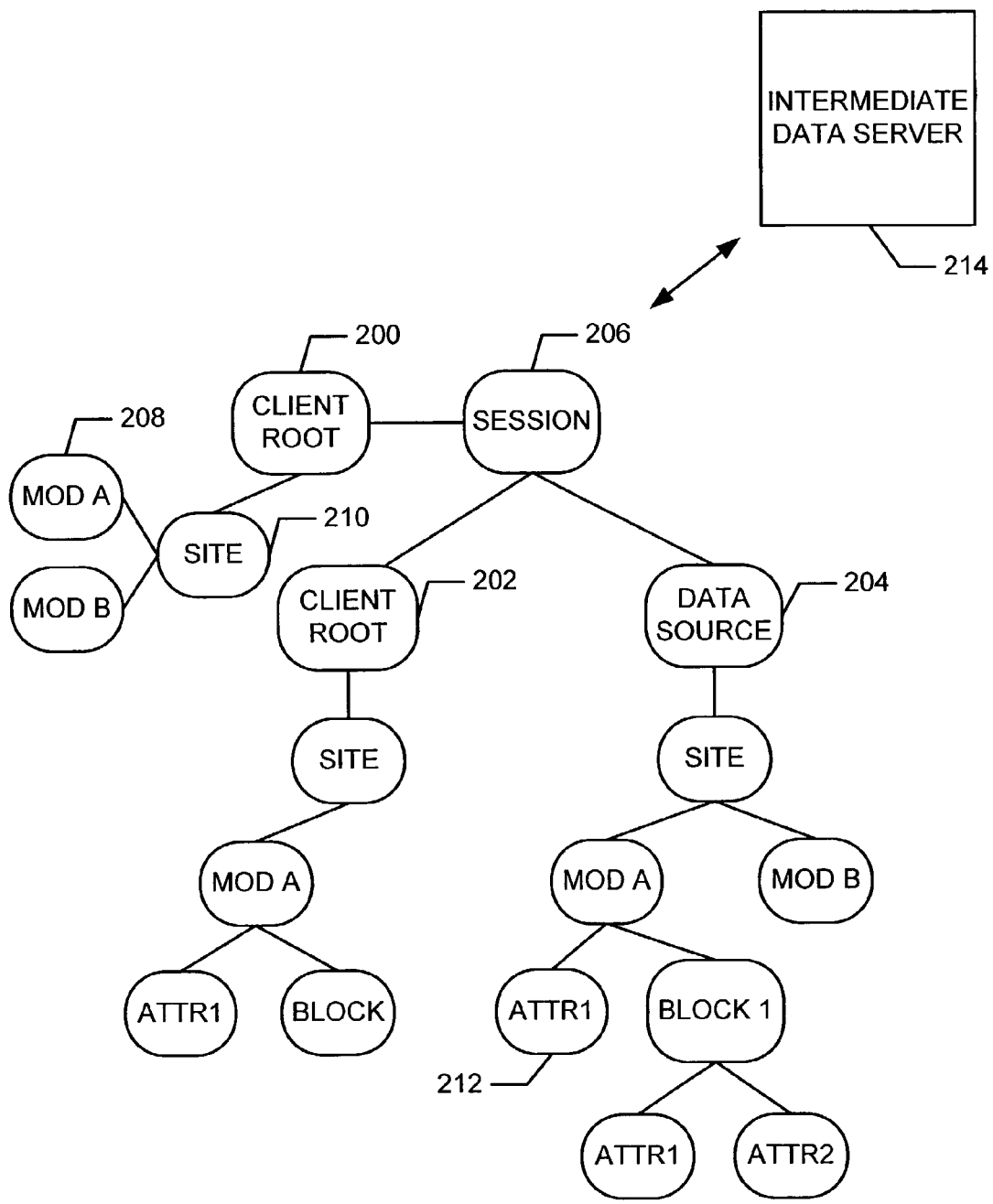
FIG. 5 is a detailed diagrammatic view that depicts an example of one manner in which client applications may access information or data stored within a data source associated with an intermediate data server.

FIG. 5 is a detailed diagrammatic view that depicts an example of one manner in which client applications may access information or data stored within an intermediate data server process data source. In particular, the states for client applications are maintained by one or more client roots 200 and 202. The client roots 200 and 202 are windows onto a data source 204. A session 206 manages the interactions between the client roots 200 and 202 and the data source 204. For example, the client roots 200 and 202 may hold the states for the respective client applications 128 and 130 (FIG. 4), the data source 204 may correspond to the data source 136 and the session 206 may correspond to the session 134. In this way, the client applications 128 and 130 do not have to directly access the data source 136 and, instead, can maintain respective application states (corresponding to the client roots 200 and 202) that may be quickly and repeatedly accessed for data that is currently locally stored within the intermediate data server process 122. For example, if the client application associated with the client root 200 requires information associated with a module object 208 (MOD A), the session 206 can traverse the client root 200 and a site object 210 to retrieve the needed information from the module object 208. On the other hand, if the client application associated with the client root 200 requires information associated with an attribute 212 (ATTR1), the session process 206 traverses the data source 204 to retrieve the information associated with the attribute 212 and sends such information to be added to the application state associated with the client root 200. Still further, if the client application associated with the client root 200 requires information that is not locally stored (i.e., that is not already stored or loaded into the local data source 204), the session process 206 may retrieve such information from an intermediate data server process 214. The intermediate data server process 214 may correspond to, for example, the intermediate data server process 124 shown in FIG. 4. Although two client roots are shown in FIG. 5, one or more than two client roots could be used instead.

As generally described in connection with FIGS. 4 and 5 above, information needed by client applications (erg., object data including attribute values, rules, etc.) can be demand loaded (i.e., retrieved from a database and locally cached as needed). While the apparatus and methods described herein enable information to be demand loaded on an elemental basis (i.e., one object at a time), further communication efficiencies may be achieved by recognizing database access patterns and demand loading somewhat more information than specifically requested by an application. In other words, database access patterns can be used to anticipate what information is likely to be needed following an application request for a particular piece of information. For example, when a client application traverses from a module object to an attribute role (i.e., the client application requests the attribute role information from another data server), a subsequent request for the attribute values usually follows because such information is usually displayed along with the attribute names and types. Thus, to increase communication efficiency (i.e., to reduce the overall amount of network communications), attribute values may always be sent along with attribute role information. More generally, communication efficiencies may be achieved by anticipating the characteristic information request patterns that are particular to applications and then bundling information in a manner that is consistent with those access patterns to minimize network communications (i.e., the number of round trip communications required to obtain the information needed by client applications).

In the event that a client application requires off-line access to a system database (e.g., when an off-line editing session is desired), the entire contents of the database (i.e., all rules and data) may be requested and locally cached. In this manner, a client application can enable a system user to engage in a full editing session off-line. Because all of the rules are locally available, local rule checking can be used during such an off-line editing session to facilitate subsequent data synchronization and reconciliation activities upon reconnection of the client application to the central database (i.e., ending the off-line editing session). Such data synchronization and reconciliation activities may be implemented using the example object change handling techniques described below.

Client applications (e.g., the client application 128 and 130) may access information stored within a locally stored or cached data source (e.g., the data source 136) and may modify or change this information. For example, the client application 128 (FIG. 4) may correspond to the client root 200 (FIG. 5) and may traverse the client root 200 to access information associate with the module 208. When the client application 128 attempts to modify information (e.g., roles and/or properties) in the module 208 within the context of a transaction, subject to the database rules (i.e., rule checking) a "dirty" object is created to store the attempted modifications. If a transaction is nested and thus, further attempts to change or modify information associated with the module 208 occur, another dirty object is created to store those further changes. Additional dirty objects may be generated as additional inner nested transactions are executed. Once the innermost nested transaction has been committed, the changes reflected in the innermost dirty object are transferred to the dirty object associated with the next outer transaction. The transfer of the dirty object change information from an inner transaction to the next outer transaction continues as the inner objects are committed and until all of the changes have been transferred to the dirty object associated with the outermost transaction. Commitment of the outermost transaction results in the changes becoming permanent, thereby preventing any rollback of the changes (i.e., reversion of the changes to the state of the application prior to the start of the transaction).

As described above, transactions (and nested transactions) enable applications to effect or record changes to object information within their respective client roots. However, client applications can additionally write or record object changes to a database (e.g., the database 126), thereby enabling all of the intermediate data servers coupled to that database to provide the changed information to their respective client applications, if needed. Preferably, but not necessarily, permanent changes to object information by a client application can be written back to the database (e.g., the database 126 of FIG. 4) in response to an automatic directive from the client application and/or in response to a directive from a system user or operator.

Initially, changes committed (i.e., made permanent) to a client root (e.g., the client root 200) are written to a data source associated with the client root (e.g., the data source 204) via a session process (e.g., the session process 206). The session process then propagates any changes made to the client root to the data source (e.g., the data source 204 including any of the objects to which it is coupled). The session process 206 then sends the changed data source information to an intermediate data server that is coupled to the database. In the event that there are two or more intervening intermediate data servers between the central database and the data source sending the changed information, the changes are sent from data server to data server until they reach the database. To facilitate platform independence and increase overall system flexibility, the information is preferably, but not necessarily, conveyed between the intermediate data servers in the form of an XML document. The database enforce database rules and, if any of the information provided to the database (e.g., within received XML documents) does not comply with such rules, the database rejects (i.e., not record) the changes.

Changes received and accepted by the database may then be propagated through one or more intermediate data servers to all of the data sources associated with an enterprise. For example, an XML document containing a comprehensive list of the all the changes received by and saved to the database can be asynchronously propagated back to the client that originated the change and/or to some or all of the intermediate data servers within the enterprise or system. Similarly, changes that occur within the database which are not a result of changed information being propagated up to the central database by one or more client applications, can be asynchronously propagated as a change notification mechanism down to the data servers and, thus, the data sources that make up the enterprise. Such change notifications may be implemented using, for example, an XML document that contains data arranged in a hierarchical manner to enable efficient use of the data by data sources. A data source receiving such an XML document can skip objects within the document that have not previously been loaded and produce a new reduced XML document including only those changes pertinent to the client (s) coupled to that data source.

Figure 6:
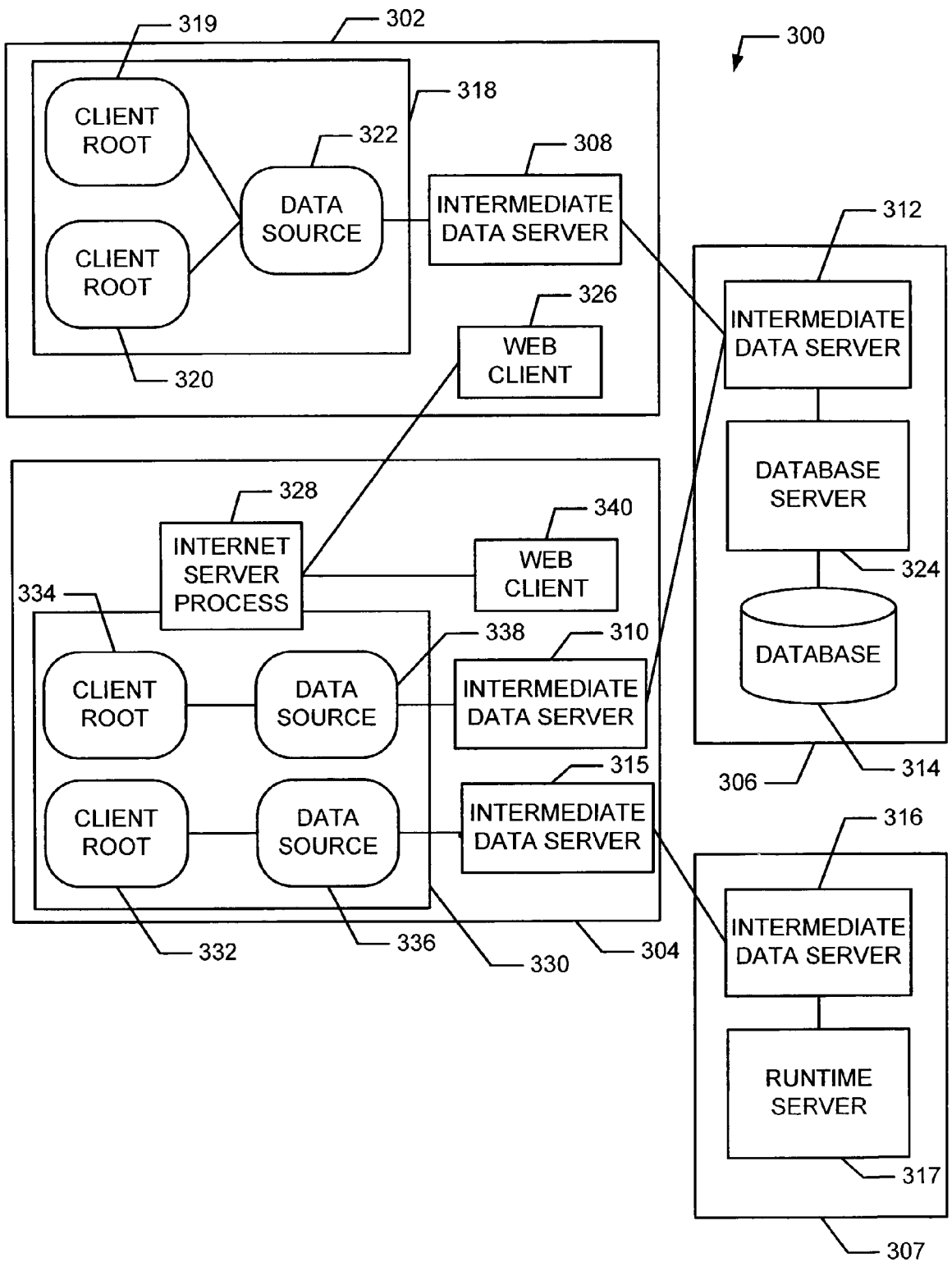
FIG. 6 is a block diagram of an example system having a plurality of processing systems that use intermediate data servers to access a database.

FIG. 6 is a block diagram of an example system 300 having a plurality of processing systems 302, 304, 306 and 307. The processing systems 302, 304 and 306 use respective intermediate data servers 308, 310 and 312 to access a database 314. Additionally, the processing systems 304 and 307 uses respective intermediate data servers 315 and 316 to access a runtime server 317. The system 302 may, for example, be an application station (e.g., one of the workstations 18, 20 and 42 of FIG. 1) that is executing one or more Windows®-based client applications 318. The applications 318 may include client roots 319 and 320 that are coupled to a data source 322. The data source 322 may be coupled to the database 314 via the intermediate data server 312 via a database server 324. The system 302 may also include a web client 326 that is communicatively coupled to the system 304 as described in greater detail below.

The system 304 may be, for example, a web server (which may be implemented using a workstation or any other processing system) that executes an internet server process 328 having one or more session states 330 (which are analogous to application states). The session states 330 include client roots 332 and 334 and respective data sources 336 and 338, which are communicatively coupled to the intermediate data servers 310 and 315. Thus, the session states 330 can access information (e.g., data, rules, etc.) stored within the database 314 and/or the runtime server 317. The system 304 may also include a web client 340 that is communicatively coupled to the internet server process 328. Thus, the web clients 326 and 340 may each correspond to one of the session states 330 (i.e., one of the client roots 332 and 334) and may interoperate with the intermediate data servers 310, 312, 315 and 316 to exchange information with the database 314 and/or the runtime server 317 using the methods described herein.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of propagating information within a networked system, comprising:

receiving, at a first one of a plurality of intermediate data servers within the networked system, a request for first information, the plurality of intermediate data servers in communication with a plurality of client applications and adapted to interoperate to retrieve and store, in respective local data sources, subsets of information in accordance with informational needs of at least some of the client applications, the request for the first information associated with a first one of the plurality of client applications;

receiving, at a second one of the plurality of intermediate data servers, the request for the first information when the first information is not locally stored in a first one of the local data sources associated with the first intermediate data server;

when the first information is not locally stored in a second one of the local data sources associated with the second intermediate data server, determining an access pattern associated with a database and the first client application, wherein the access pattern is indicative of different information separately requestable by the first client application from the database, the database storing information associated with a process control system;

selecting the first information within the database to form second information based on the access pattern and the first client application;

sending the second information to the second intermediate data server within the networked system;

sending the second information from the second intermediate data server to the first intermediate data server; and storing at least a portion of the second information in the first local data source associated with the first client application, wherein the first local data source is local to the first client application to enable the client application to access the at least the portion of the second information in the first local data source when the first client application is off-line.

2. A method as defined in claim 1, wherein sending the second information from the second intermediate data server to the first intermediate data server includes sending an extensible markup language document from the second intermediate data server to the first intermediate data server.

3. A method as defined in claim 1, wherein storing the at least the portion of the second information in the first local data source associated with the first client application includes storing information associated with other information requested by the first client application.

4. A method as defined in claim 1, wherein the second information includes rules for accessing data associated with the process control system.

5. A method as defined in claim 1, wherein storing the at least the portion of the second information in the first local data source enables the first client application to access the second information from the first local data source faster than accessing the second information from the second intermediate data server.

6. A method as defined in claim 1, further comprising storing the at least the portion of the second information in a plurality of other data sources, each of which is local to another client application.

7. A method as defined in claim 1, further comprising communicating a listing of changes associated with the first information and the second information to the database.

8. A method as defined in claim 1, further comprising:
receiving a first data access request from the first client application, wherein the first information is not requested via the first data access request; and
responsive to the first data access request, selecting the first information within the database in response to predicting based on the first data access request, that the first information is to be requested via a subsequent data access request.

9. A system to propagate information within a networked system, comprising:
a first one of a plurality of intermediate data servers within the networked system to receive a request for first information, the plurality of intermediate data servers in communication with a plurality of client applications and adapted to interoperate to retrieve and store, in respective local data sources, subsets of information in accordance with informational needs of at least some of the client applications, the request for the first information associated with a first one of the plurality of client applications;
a second one of the plurality of intermediate data servers to receive the request for the first information when the first information is not locally stored in a first one of the local data sources associated with the first intermediate data server;
a database to store information associated with a process control system and configured to determine an access pattern associated with the first client application when the first information is not locally stored in a second one of the local data sources associated with the second intermediate data server, and the database to select the first information to form second information based on the access pattern and the first client application, wherein the access pattern is indicative of different information separately requestable by the first client application from the database;
the second intermediate data server configured to receive the second information from the database;
the first intermediate data server configured to receive the second information from the second intermediate data server; and
a first one of the local data sources associated with the first client application and configured to store at least a portion of the second information, wherein the first local data source is local to the first client application and enables the first client application to access the at least the portion of the second information in the first local data source when the first client application is off-line.

10. A system as defined in claim 9, wherein the first intermediate data server is configured to receive the second information from the second intermediate data server using an extensible markup language document.

11. A system as defined in claim 9, wherein the first local data source is configured to store the at least the portion of the second information in association with other information requested by the first client application.

12. A system as defined in claim 9, wherein the second information includes rules for accessing data associated with the process control system.

13. A system as defined in claim 9, wherein the first local data source is configured to enable the first client application to access the second information from the first local data source faster than accessing the second information from the second intermediate data server.

14. A system as defined in claim 9, further comprising a plurality of other data sources, each of which is local to another client application and configured to store the at least the portion of the second information.

15. A system as defined in claim 9, wherein the first intermediate data server is configured to communicate a listing of changes associated with the first information and the second information to the database.

16. A system as defined in claim 9, wherein the database is further configured to:
receive a first data access request from the first client application, wherein the first information is not requested via the first data access request; and
responsive to the first data access request, select the first information in response to predicting, based on the first data access request, that the first information is to be requested via a subsequent data access request.

17. A machine readable medium having instructions stored thereon that, when executed, cause:
a first one of a plurality of intermediate data servers within the networked system to receive a request for first information, the plurality of intermediate data servers in communication with a plurality of client applications and adapted to interoperate to retrieve and store, in respective local data sources, subsets of information in accordance with informational needs of at least some of the client applications, the request for the first information associated with a first one of the plurality of client applications;
a second one of the plurality of intermediate data servers to receive the request for the first information when the first information is not locally stored in a first one of the local data sources associated with the first intermediate data server;
a database to store information associated with a process control system, determine an access pattern associated with the first client application when the first information is not locally stored in a second one of the local data sources associated with the second intermediate data server, and select the first information to form second information based on the access pattern and the first client application, wherein the access pattern is indicative of different information separately requestable by the first client application from the database;
the second intermediate data server to receive the second information from the database;
the first intermediate data server to receive the second information from the second intermediate data server; and
the first local data source to store at least a portion of the second information, wherein the first local data source is local to the first client application and enables the first client application to access the at least the portion of the second information in the first local data source when the first client application is off-line.

18. A machine readable medium as defined in claim 17 having instructions stored thereon that, when executed, cause the first intermediate data server to receive the second information from the second intermediate data server using an extensible markup language document.

19. A machine readable medium as defined in claim 17 having instructions stored thereon that, when executed, cause the first local data source to store the at least the portion of the second information in association with other information requested by the first client application.

20. A machine readable medium as defined in claim 17, wherein the second information includes rules for accessing data associated with the process control system.

21. A machine readable medium as defined in claim 17 having instructions stored thereon that, when executed, cause the first local data source to enable the first client application to access the second information from the first local data source faster than accessing the second information from the second intermediate data server.

22. A machine readable medium as defined in claim 17 having instructions stored thereon that, when executed, cause a plurality of other data sources, each of which is local to another client application, to store the at least the portion of the second information.

23. A machine readable medium as defined in claim 17 having instructions stored thereon that, when executed, cause the first intermediate data server to communicate a listing of changes associated with the first information and the second information to the database.

24. A machine readable medium as defined in claim 17 having instructions stored thereon that, when executed, cause the database to:
receive a first data access request from the first client application, wherein the first information is not requested via the first data access request; and
responsive to the first data access request, select the first information in response to predicting, based on the first data access request, that the first information is to be requested via a subsequent data access request.

25. A method, comprising:
receiving, at a first one of a plurality of intermediate data servers, a request for first information, the plurality of intermediate data servers in communication with a plurality of client applications and adapted to interoperate to retrieve and store, in respective local data sources, subsets of information in accordance with informational needs of at least some of the client applications, the request for the first information associated with a first one of the plurality of client applications;
receiving, at a second one of the plurality of intermediate data servers, the request for the first information when the first information is not locally stored in a first one of the local data sources associated with the first intermediate data server;
when the first information is not locally stored in a second one of the local data sources associated with the second intermediate data server, determining an access pattern associated with accessing data in a database, wherein the access pattern is indicative of different information separately requestable from the database;
selecting the first information within the database to form second information based on the access pattern;
storing the second information in the first and second intermediate data servers; and
storing at least a portion of the second information in the first local data source associated with the first client application to enable the first client application to access the portion of the second information in the first local data source.

26. A method as defined in claim 25, wherein the second information is stored in the first and second intermediate data servers using an extensible markup language format.

27. A method as defined in claim 25, wherein the second information includes a plurality of rules associated with processing at least some of the second information.

28. A method as defined in claim 25, further comprising selecting the first information within the database in response to a request from the first client application.

29. A method as defined in claim 25, further comprising communicating a listing of changes associated with the first information and the second information to the database.

30. A method as defined in claim 25, further comprising:
receiving a first data access request, wherein the first information is not requested via the first data access request; and
responsive to the first data access request, selecting the first information within the database in response to predicting, based on the first data access request, that the first information is to be requested via a subsequent data access request.

* * * * *